United States Patent
Nguyen et al.

(10) Patent No.: US 10,911,083 B2
(45) Date of Patent: Feb. 2, 2021

(54) METHOD OF ADJUSTING AND CONTROLLING THE RECEIVER POWER ADAPTATION ACCORDING TO THE TRANSMISSION ENVIRONMENT IN ENODEB LTE SYSTEM

(71) Applicant: VIETTEL GROUP, Ha Noi (VN)

(72) Inventors: Trung Tien Nguyen, Ha Noi (VN); Thi Xuan Hoa Ho, Ha Noi (VN); Xuan Hao Luong, Ha Noi (VN); Truong Giang Le, Ha Noi (VN); Tuan Duc Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 16/579,029

(22) Filed: Sep. 23, 2019

(65) Prior Publication Data
US 2020/0099409 A1 Mar. 26, 2020

(30) Foreign Application Priority Data
Sep. 24, 2018 (VN) .................. VN1-2018-04218

(51) Int. Cl.
| | | |
|---|---|---|
| *H04B 1/10* | (2006.01) | |
| *H04W 72/08* | (2009.01) | |
| *H04B 1/12* | (2006.01) | |
| *H04B 17/336* | (2015.01) | |
| *H04B 17/318* | (2015.01) | |
| *H04W 72/04* | (2009.01) | |

(52) U.S. Cl.
CPC ........... *H04B 1/1027* (2013.01); *H04B 1/123* (2013.01); *H04B 17/318* (2015.01); *H04B 17/336* (2015.01); *H04W 72/0413* (2013.01); *H04W 72/082* (2013.01)

(58) Field of Classification Search
CPC .......... H04L 31/1027; H04W 72/0413; H04W 72/082; H04B 1/123; H04B 17/318; H04B 17/336
See application file for complete search history.

(56) References Cited

U.S. PATENT DOCUMENTS

| | | | | |
|---|---|---|---|---|
| 10,820,282 B2* | 10/2020 | Abdelmonem | ....... | H04L 5/0023 |
| 2016/0050575 A1* | 2/2016 | Seo | ........ | H04B 17/00 370/252 |
| 2016/0309476 A1* | 10/2016 | Madan | ............. | H04W 72/0453 |
| 2017/0013628 A1* | 1/2017 | Kim | ................... | H04W 56/002 |
| 2019/0200363 A1* | 6/2019 | Rajendran | .......... | H04W 52/225 |

* cited by examiner

Primary Examiner — Syed Ali
(74) Attorney, Agent, or Firm — PatentTM.US

(57) ABSTRACT

A power control and correction method capable of adapting to each type of transmission environment, addressing interference problems of user devices in the network, and ensuring good signal quality for signal decoding. The method adjusts and controls the receiver power adaptation according to the transmission environment in the eNodeB LTE system.

1 Claim, 14 Drawing Sheets

METHOD OF ADJUSTING AND CONTROLLING THE RECEIVER POWER ADAPTATION ACCORDING TO THE TRANSMISSION ENVIRONMENT IN ENODEB LTE SYSTEM

TECHNICAL FIELD

The invention deals with a way to adjust and control the power of the receiver side, which can adapt to many transmission environments of the eNodeB system to optimize and increase the system processing performance.

TECHNICAL STATUS OF THE INVENTION

In general telecommunication systems and eNodeB systems in particular, the control of receiver equipment has an important role and directly affects the quality and throughput of the entire network. Furthermore, Long Term Evolution (LTE) uses wide spectrum in a network cell, so it is easily affected by interference between network cell components and neighboring cells. Currently, all devices in the network are initially initialized to the same capacity with different types of terrain, environment, which leads to the ability of the control to not be able to kept up. At the same time, the noise in the network cell will be large because the devices are transmitting a huge power or the quality of the reception signal is bad, which affects the decoding of the reception signal. Thus, adaptive control and noise reduction in network cells play an important role in system quality and performance.

Currently, there are some solutions of equipment manufacturers such as NOKIA, ERRICSON, HUAWEI to also use power control method based on the quality report of the received side. This method is described as follows: setting a unique initialization parameter for Open-loop control of P0 and alpha values, from this value combined with the path loss estimate value transmission by user equipment (User Equipment—UE) reports to eNodeB via PL (Path-Loss), which in turn calculates the remaining power that this UE can deliver to increase or decrease the capacity according to each data cycle. After that, the power control will switch to closed control (Close-loop) according to the standards of the 3rd Generation Partnership Project (3GPP).

Recently, NOKIA added a method to measure the total data power of the data through the Received Signal Strength Indication (RSSI) to increase the reliability of controlling each UE data for the part. Close-loop control, reducing errors when increasing or decreasing the expected capacity with actual capacity.

However, the above solutions have some disadvantages:
The above solutions have the same initial capacity initialization problem with different types of terrain and environment, which leads to the ability of the control that cannot be timely responded to. Although there is an offset of closed-loop control, it is not possible to achieve power balance as well as optimal performance for each type of network deployment environment.

In addition, the initialization of the initialization will cause the interference effect in large network cells (cells) because the devices all generate large capacity or poor signal quality, which affects the results of the decoding. The receiver effect, because the initialization process cannot get a closed tuning intervention according to 3GPP's proposed standards.

TECHNICAL NATURE OF THE INVENTION

Therefore, the purpose of the present invention is to create a new power control and correction method capable of adapting to each type of transmission environment, addressing interference problems of user devices in the network, and ensuring good signal quality for signal decoding.

In order to achieve the above-mentioned purpose, the present invention provides a method for adjusting and controlling the receiver power adaptation according to the transmission environment in the eNodeB LTE system, including:

a) Set up initialization parameters and input data collection system including the following steps:
   ai) initializes the system setup with the number of input antennas and corresponding bandwidth,
   aii) set initialization parameters for non-closed (Open-Loop) P0 and alpha power control values; where P0 is the absolute initial capacity for the uplink user data channel (Physical Uplink Shared Channel—PUSCH), alpha is the relative value of the power of the user device (User Equipment—UE) with the current location when accessing,
   aiii) Measure and obtain statistics the input parameter set including: Signal per Interference and Noise Ratio (SINR), Received Signal Strength Indication (RSSI), relative position the predetermined device (Timing Advance—TA) and noise (Noise plus Interference—NI) according to the N pattern cycle through the collection software—real-time calculation, b) Standardization, data assessment and classification of typical environments include the following steps:
   bi) calculate the average real SINR value of N samples collected in step aiii) by the following formula:

$$SINR\_sample\_i = (P0 + alpha * PL + delta\_pusch + f\_i) * 2 - NI + 153$$

In which:
   SINR_sample_i is the average real SINR value of the sample i;
   delta_pusch is the data channel coefficient of the uplink user, the value assigned is 0;
   f_i is the sample i of the offset update index, the value assigned to 0;
   NI is interference index and standard noise;
   P0 and alpha are described above;
   bii) standardize the collected data according to the input parameter set;
   biii) compare the post-standardized value at the bii step) with the setting value of the environment to separate each type of typical environment by using a percentage assessment method against the input N sample, in there:
   if the percentage of the RSSI value is less than 40% samples, then the RSSI state check flag is equal to 1, at which time the typical environment type 1 is differentiated;
   if the percentage of NI value is bigger than 10% samples, the NI state check flag is equal to 1, at which time the typical environment type 2 is differentiated;
   if the percentage of TA value is bigger than 10% samples, the TA status flag is equal to 1, at which time the typical environment type 3 is differentiated;
   if the percentage of SINR value is bigger than 15% and decoding wrong data (Ratio_SINR_low_fail>15%), the SINR flag is equal to 1, at which time the typical environment type 4 is differentiated;

c) calculate, adjust and apply environmental adaptive control over time including the following steps:

ci) perform the environmental mapping defined in step biii) with the reference table of reference quality value of the signal according to each type of data modulation, cii) calculate the delta_sinr difference between the SINRs obtained in step ci) and the step bi), ciii) compare the calculated value in step cii) with the sampling rate repeated by bandwidth according to the following formula:

$$t\_rep = \left\lfloor \frac{10 * (\log_{10} nRB)}{t\_sam} \right\rfloor$$

In which:
t_rep is the filtering index that determines the difference with maximum standard for each bandwidth;
t_sam is the compatibility ratio corresponding to each bandwidth; and
nRB is the maximum number of physical resources corresponding to each bandwidth;

civ) the final decision will follow the following principle:
if the delta_sinr value calculated in step cii) is greater than the value t_rep calculated in step ciii) then perform the value update and decide to adjust the coefficient P0 and alpha by repeating the set of parameters P0 and alpha until when the state of the delta_sinr value is less than the value of t_rep;
in case this state is not reached, the exception option that satisfies the condition of the SINR value calculated in the ball step) is between 128 and 135, and the current value of P0 and alpha is stored, if outside this range, increase P0 value by 2 units;
if the delta_sinr value calculated in step cii) is less than the value t_rep calculated in step ciii), update the current value of P0 and alpha.

According to the method of the present invention, the collection and standardization, data evaluation and classification of specific environments and comparisons determine how to update the value of P0 and alpha as the key points for adjustment and control adaptive transmission capacity according to eNodeB transmission environment.

BRIEF DESCRIPTION OF DRAWINGS

The purposes, aspects, signs and advantages of the above invention will become clear and understood more easily by referring to the following description in conjunction with the accompanying drawings, in which.

DETAILED DESCRIPTION OF THE INVENTION

In the system optimization of eNodeB system, the control of power of the receiver line plays an important role, to achieve the optimal control, it is necessary to overcome the disadvantages of the current and capable power control method, ability to adjust according to each type of transmission environment.

Figure 1:
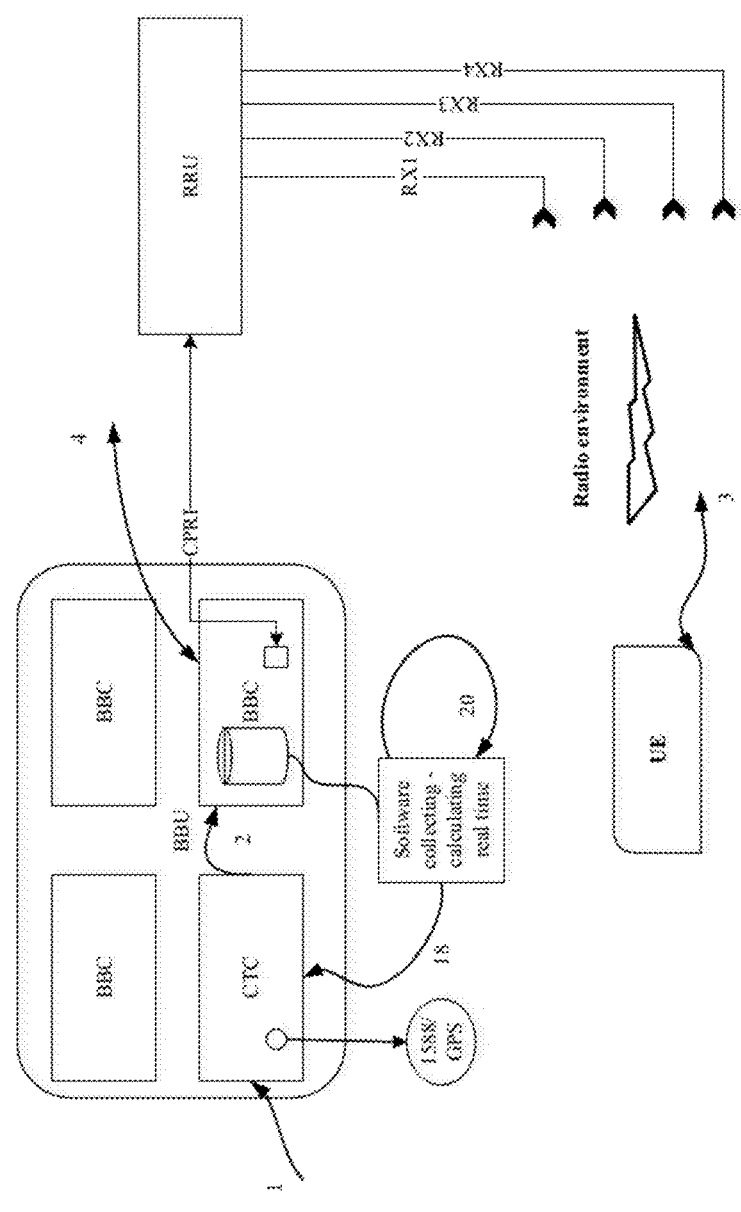
FIG. 1 is a block diagram that describes the overall setup of a UE user device synchronization system with the original tape processing system (Baseband Card—BBU/remote radio unit (Remote Radio Unit—RRU) apply the method of the invention.

FIG. 1 shows an overview of a complete system that meets the requirements of adapting and controlling the power of the adaptive power factor according to the transmission environment in the eNodeB system. In this system, the baseband unit (BBU) block consists of three baseband processing circuits (Baseband Card—BBC) connected to the RRU block through the common transmission interface standard (Common Public). Radio Interface (CPRI), and a block of control traffic cards (Control Transport Card—CTC) that provide clock synchronization from a global positioning satellite source (Global Position Satellite—GPS) or synchronous source 1588. In addition, some initial configuration information of the system was updated from CTC to BBC. In this model, user equipment (UE) will perform high-frequency radio signal exchange for each RRU antenna. The data after going through the RRU will be lowered in frequency and converted to analog, digital data obtained will be sent to the BBC block via CPRI protocol. Real-time data acquisition and calculation software will decode data and estimate channel estimates for each message transfer between physical layer controller and environment access control layer processor (Medium Access Control—MAC) with UE. The information collected in this software will then analyze the exchange environment between the UE and eNodeB groups, thereby applying the calibration method to suit each environmental group in controlling the power of the receiver line. Thereby increasing the ability to decode successfully, reducing interference between devices within the coverage of eNodeB, saving UE's power and reducing energy consumption during use. At the same time, overcome the disadvantages of using only an initial value of power for all working environments, and then proceed with closed cyclic control with maximum jump every increase or decrease. UE output is 3 dB leading to low response.

Figure 2:
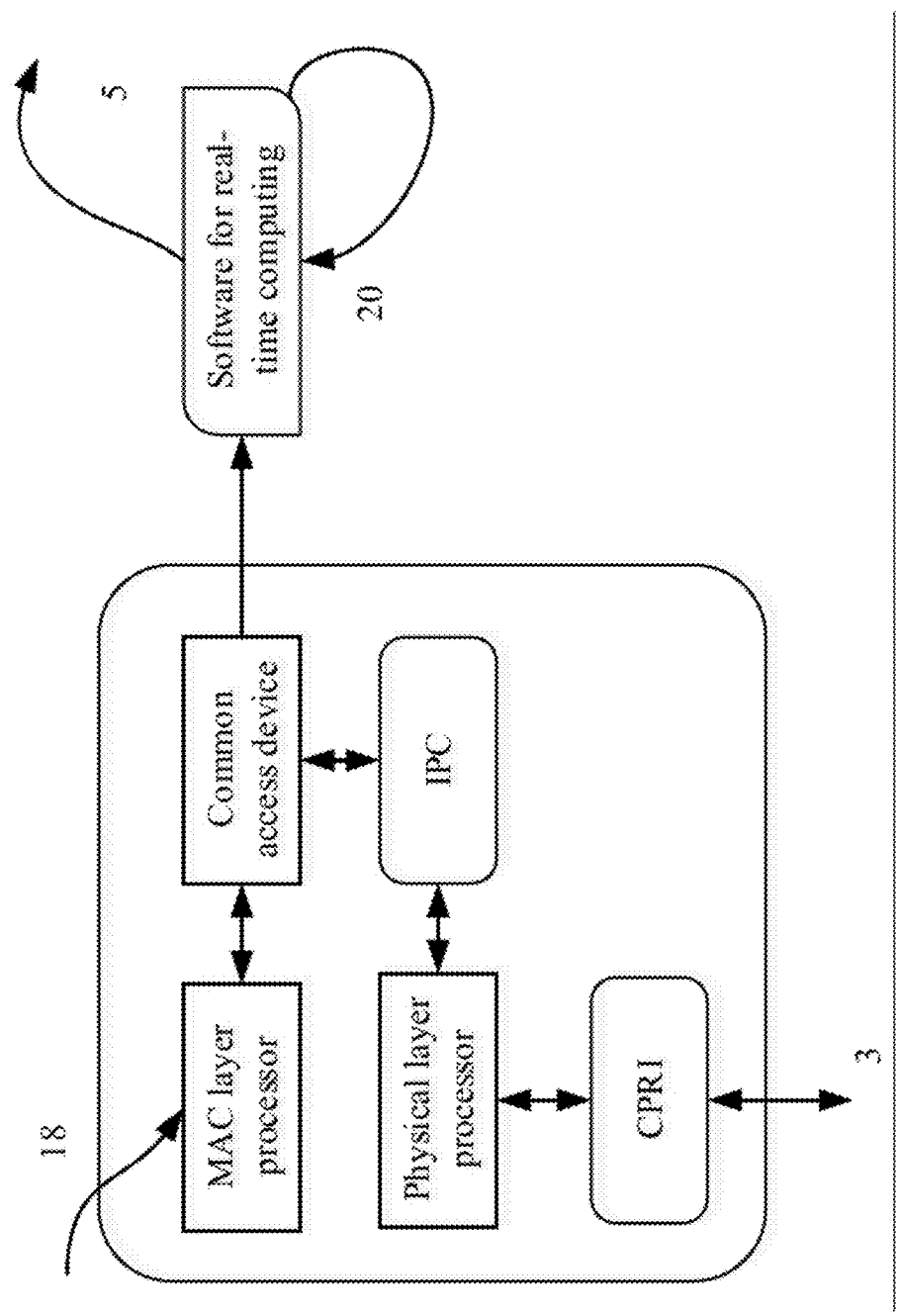
FIG. 2 is a block diagram view that describes the processing data flow between the physical layer processor and the collection software—real-time computing.

FIG. 2 describes in detail the operation of the original tape processing unit on the BBC including the physical layer processor and the MAC layer processor combined with the collection software—real-time computing. The steps are as follows:

Step 1: Perform data exchange between UE and eNodeB after lowering frequency and converting to digital form through CPRI block.

Step 2: The physical layer processing unit will take data on the CPRI data storage area to decode and transfer the result after decoding via IPC (Inter-process Communication) block to the shared access memory.

Step 3: On this shared access device, the MAC layer processor will retrieve decode information and send scheduling information to the physical layer processor.

Step 4: Receive data after decoding and access by real-time collecting-calculating software.

Step 5: Implement the standardization method, evaluate and isolate the transmission medium on this software.

Step 6: Send the final updated results to the control configuration as detailed in FIG. 12 and FIG. 13.

Figure 9:
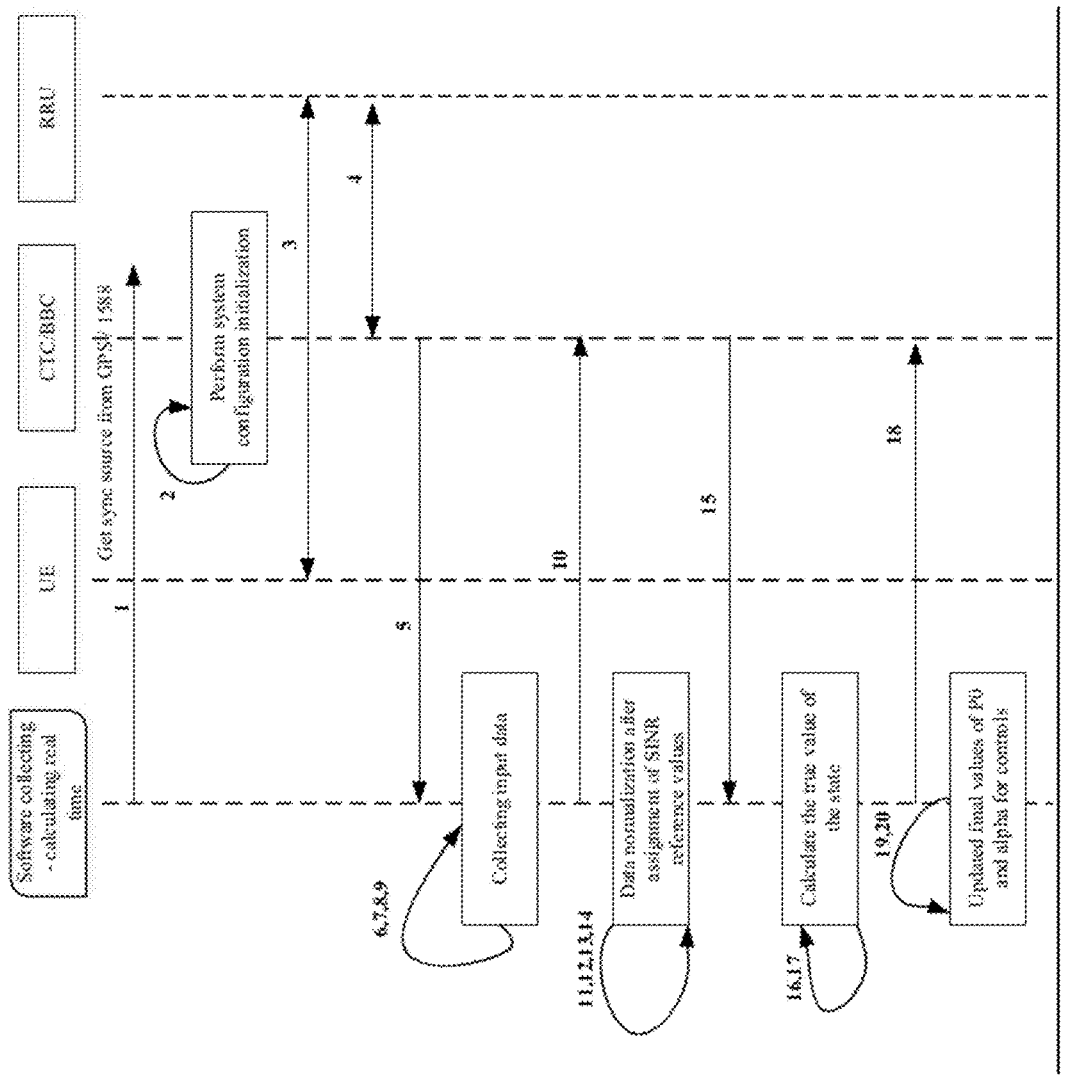
FIG. 9 is a data flow diagram showing the communication between the collected software—real-time computing, UE, CTC/BBC and RRU user devices.

FIG. 9 is a flowchart detailing the controller's communication processing sequence—calculating throughput, signal generators, CTC/BBC and RRU during the entire real-time closed real-time execution process, processing. The order of the processing flow is numbered accordingly as an example of the invention's implementation method.

Figure 3:
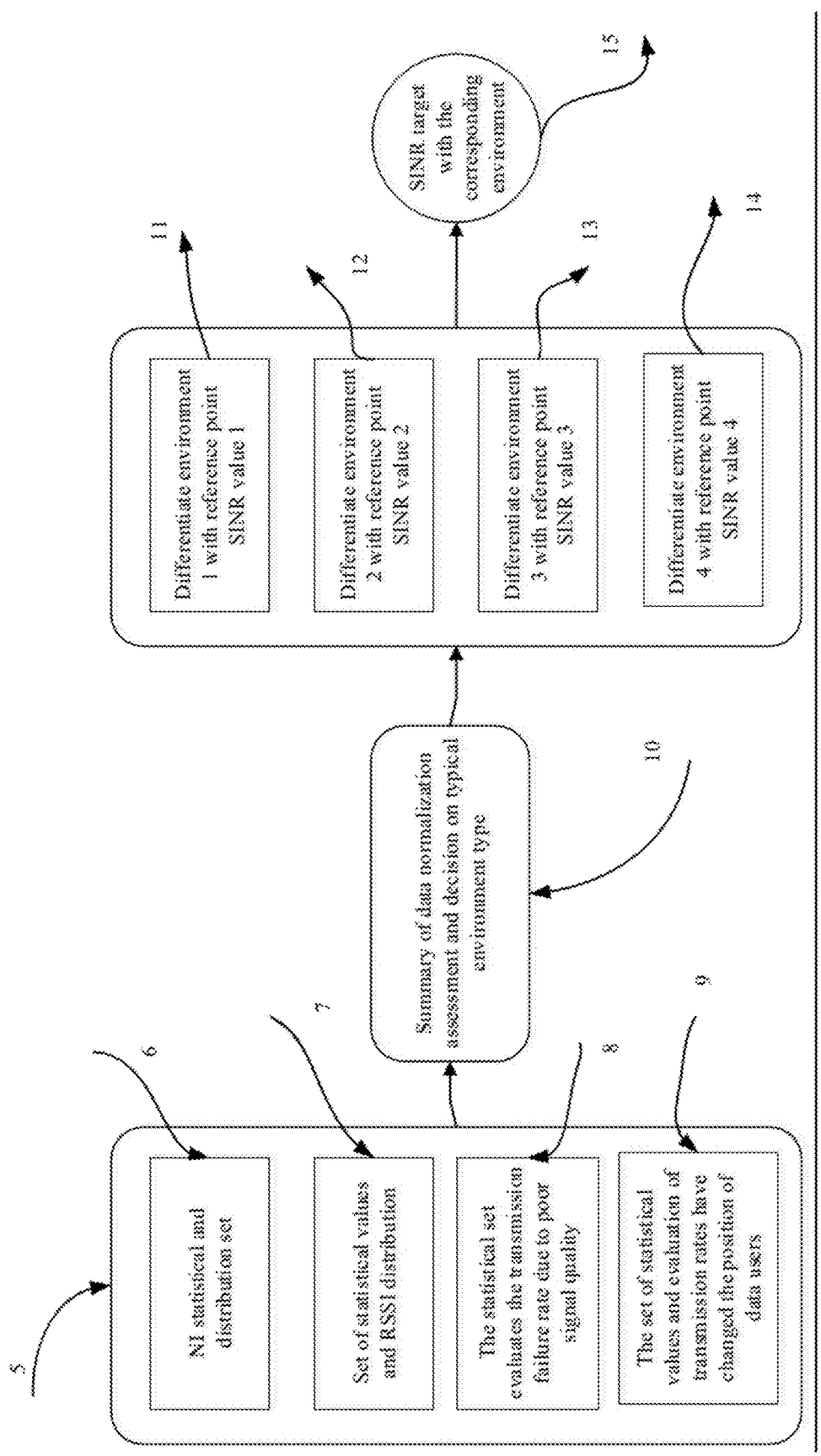
FIG. 3 is a block diagram drawing depicting the main components of a software collection—real-time calculation.
Figure 4:
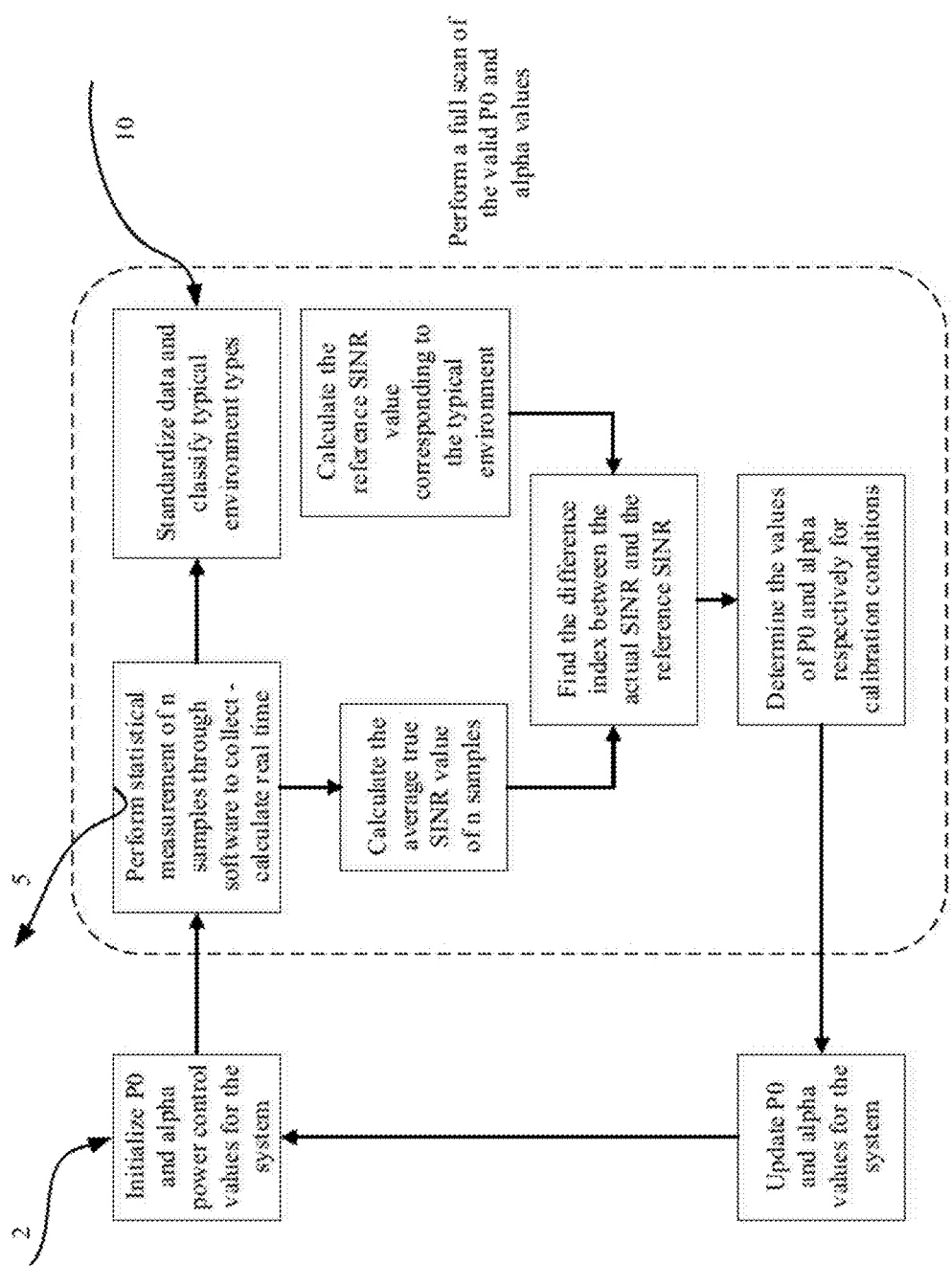
FIG. 4 is a diagram of a block diagram describing the algorithm and processing flow of an environmental response adjustment method.

FIGS. 3 and 4 describe in detail the main processing unit and the operation of the acquisition software—real-time computation and use of the results to make adjustments and controls tailored to each individual environment, the steps are as follows:

Step 1: Initialize P0 and alpha power control values for the system

Step 2: Perform statistical measurement of n samples through software collecting—calculating real-time. Information includes blocks as follows:
  NI value and distribution statistic: statistics about the value and distribution of noise and noise.
  RSSI value and distribution statistics: statistics about the value and distribution of the signal strength index.
  the set of statistical values assesses the transmission rate failure due to poor signal quality: statistics on values and SINR distribution provided that decoding fails.
  Ministry of statistics of value and assessment of transmission rate with change of data location of users: statistics on TA value and distribution.

Step 3: Standardize data and classify typical environment types. Summary of data normalization assessment and decision on typical environment type
  Differentiate environment 1 with reference point SINR value 1.
  Dividing environment 2 with reference point SINR value 2.
  Dividing environment 3 with reference point SINR value 3.
  Differentiate environment 4 with reference point SINR value 4.
  Summarize and produce SINR target with corresponding environment.

Step 4: Calculate the average real SINR value of n samples.

Step 5: Calculate the reference SINR value corresponding to the typical environment.

Step 6: Find the difference index between real SINR and reference SINR.

Step 7: Perform a full scan of valid P0 and alpha values.

Step 8: Decide the value of P0 and alpha corresponding to correction conditions.

Step 9: Update the P0 and alpha values for the system.

Figure 5:
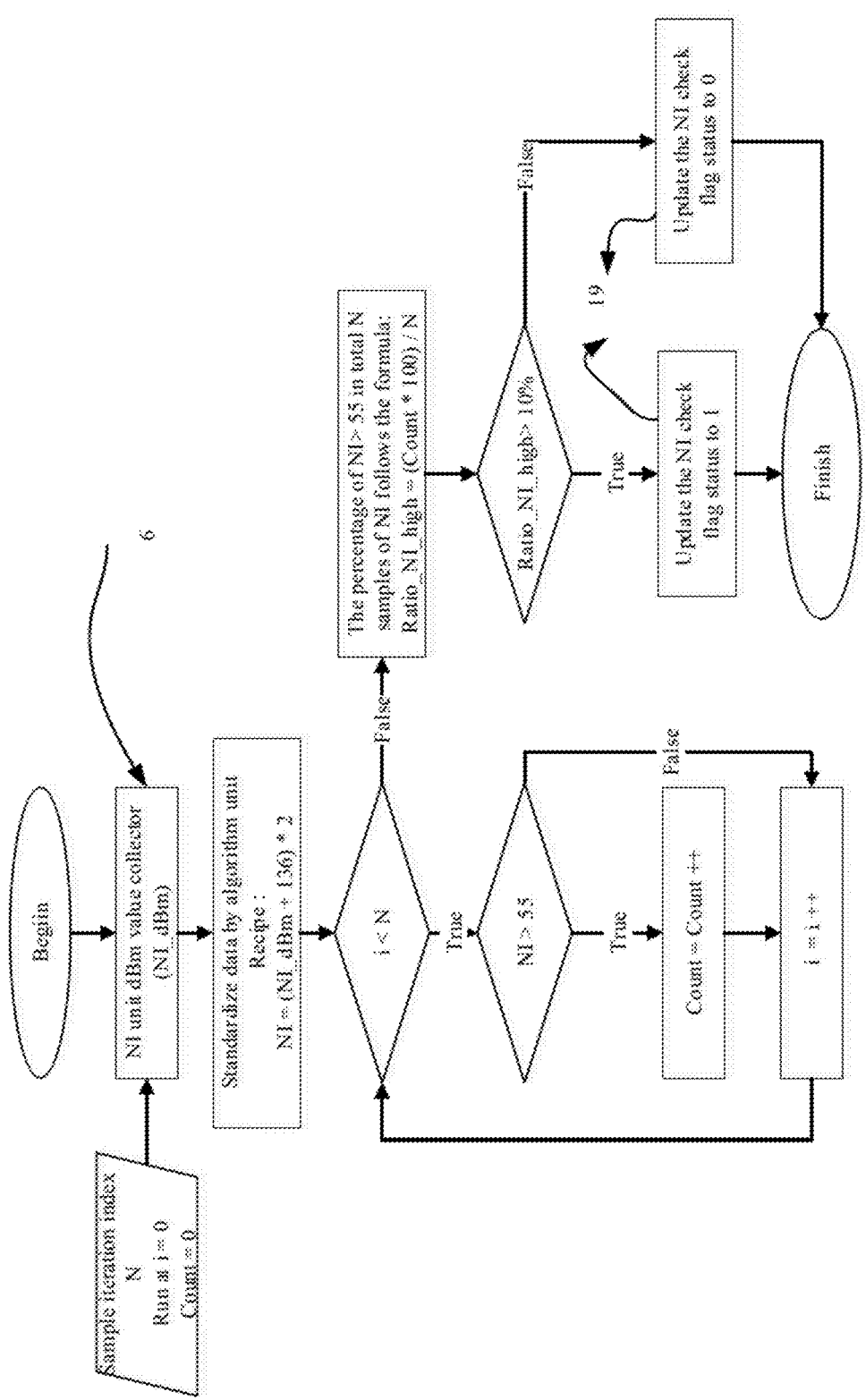
FIG. 5 is a diagram of a block diagram describing the algorithm of standardizing noise data and interference (Noise plus Interference—NI) and data computation method for NI.

FIG. 5 describes in detail the standardized collection algorithm and evaluation of NI value of eNodeB system, the steps are as follows:

Step 1: Initialize the loop value i=0, count variables count=0 along with the number of samples is a given N.

Step 2: Storing the NI value of N samples through the NI information storage bulletin part of the NI statistics and distribution, NI Collection unit of dBm symbol (NI_dBm).

Step 3: Implement standardization of data according to the algorithm unit according to the following formula $NI=(NI\_dBm+136)*2$ Step 4: Perform index iteration from i to N,
  If i<N is correct, continue checking the condition
    If the value NI>55 is correct:
      Then increase the count by 1 unit then increase the variable I by 1 unit
    If NI value <55 is wrong:
      Then increase the count I variable to 1 unit.
      The loop cycle in case of still meeting the condition code i<N.
  Where i<N is wrong
    End the iteration process, switch to scaling according to the sample method, in which the number of countable samples NI>55 is the count value and N the survey sample. The formula converted as follows:

$$\text{Ratio\_NI\_high} = \frac{(\text{Count} * 100)}{N}$$

where Ratio_NI_high represents a high NI with a value greater than 55.

Step 5: Store the calculation value of Ratio_NI_high above and conduct the check
  In case Ratio_NI_high>10% is true:
    Then update NI check flag status to 1.
  In case Ratio_NI_high>10% is false:
    Then update the state of the NI test flag by 0.
  Store this state on the clipboard to serve the environment decomposition shown in FIG. 10. Then finish the program.

Figure 6:
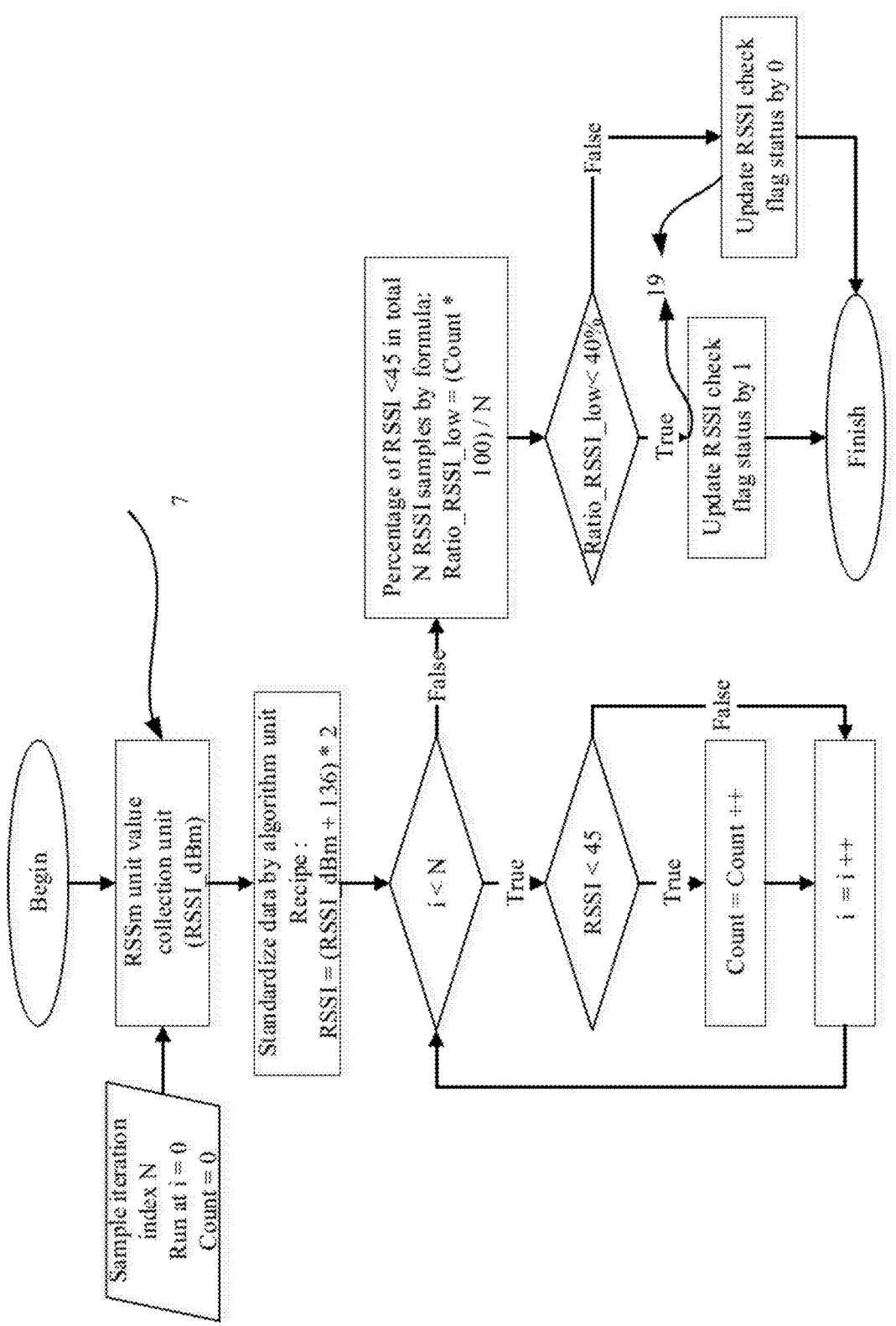
FIG. 6 is a diagram of a block diagram describing the algorithm to standardize the Received Signal Strength Indication (RSSI) and the method of calculating data differentiation for RSSI.

FIG. 6 shows a detailed description of the algorithm for standardizing and evaluating the RSSI value of the eNodeB system, the steps are as follows:

Step 1: Initialize the loop value i=0, count variables count=0 along with the number of samples is a given N.

Step 2: Store the RSSI value of N samples through the RSSI information store of the set of value statistics and RSSI distribution, the value collector RSSI unit of dBm symbol (RSSI_dBm).

Step 3: Standardize data according to algorithm unit by the following formula:

$RSSI=(RSSI\_dBm+136)*2$

Step 4: Perform index iteration from i to N,
  If i<N is correct, continue checking the condition
    If the value of RSSI<45 is correct:
      Then increase the count variable to 1 unit then increase the variable i to 1 unit
    If the value or RSSI>45 is wrong:
      Then increase the count variable i to 1 unit.
      The loop cycle in case of still meeting the condition code i<N.
  Where i<N is wrong
    The end of the iteration process ends, converting to a percentage conversion by the percentage method, in which the number of countable samples RSSI<45 is the count and N sample of the survey. The formula converted as follows:

$$\text{Ratio\_RSSI\_low} = \frac{(\text{Count} * 100)}{N}$$

Figure 7:
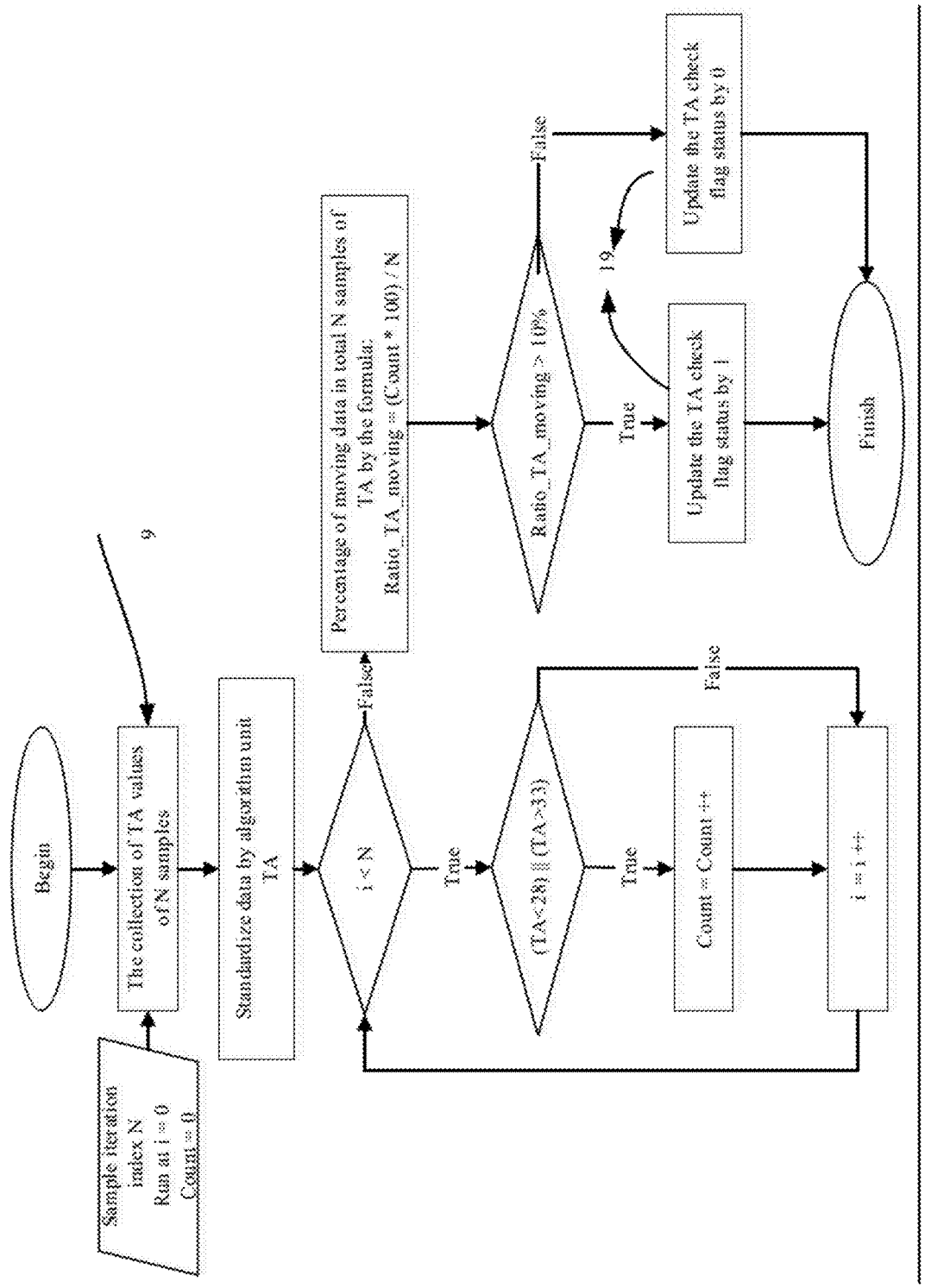
FIG. 7 is a block diagram of the model describing the device's standardization of relative position data (Timing Advance—TA) and the method of calculating data differentiation for TA.
Figure 8:
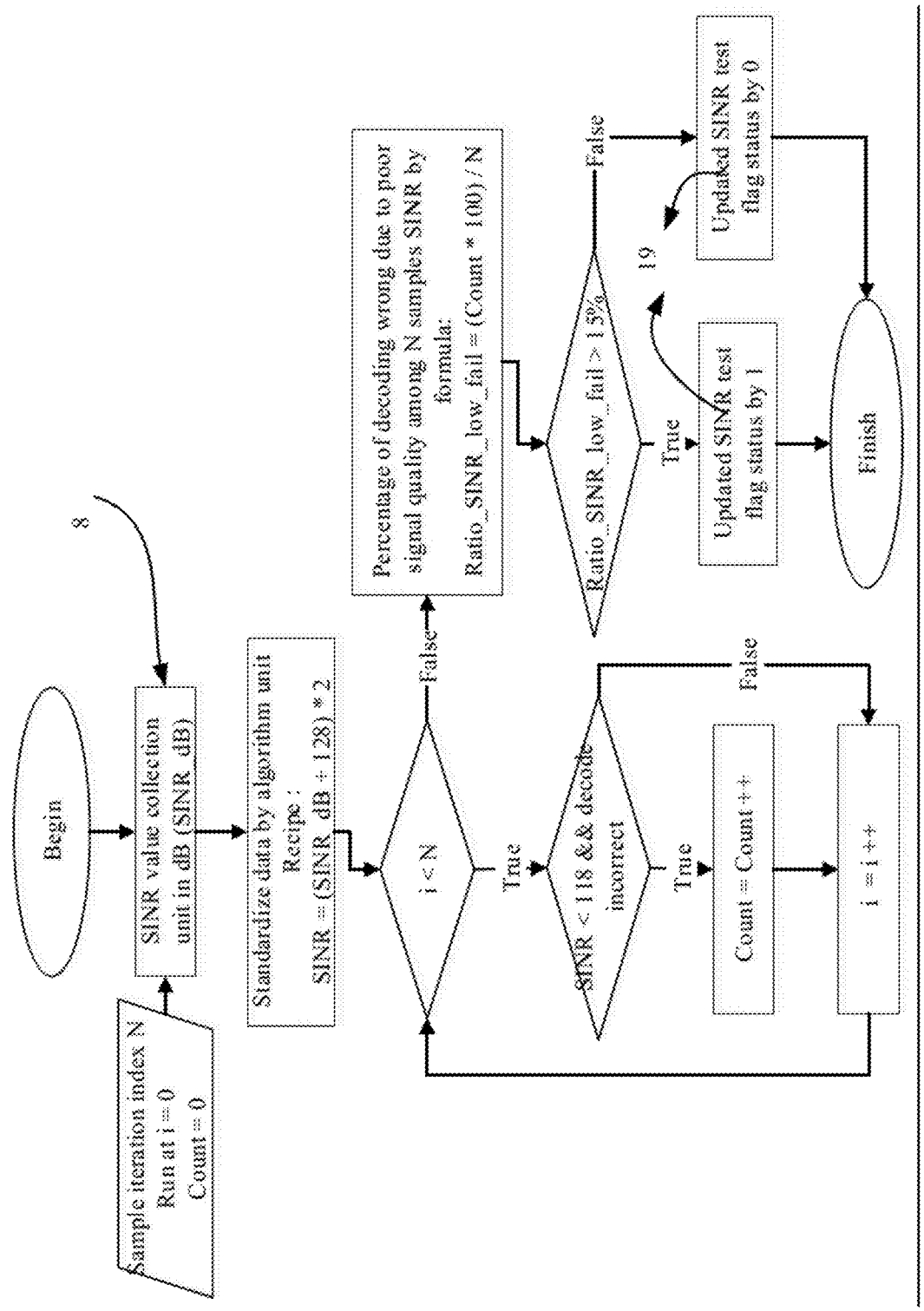
FIG. 8 is a block diagram that describes the algorithm of standardizing the signal quality ratio data on the noise interference SINR (Signal per Interference and Noise Ratio—SINR) and the method of calculating data differentiation for SINR.

In where Ratio_NI_high represents the low RSSI with a value less than 45.
Step 5: Store the Ratio_RSSI_low calculation value above and proceed with the test
  The case of Ratio_RSSI_low<40% is true:
    Then update the status check flag for RSSI by 1.
  The case of Ratio_RSSI_low<40% is wrong:
    Then update the status of the RSSI check flag by 0.
  Store this state on the clipboard to serve the environment decomposition shown in FIG. 10. Then finish the program.
FIG. 7 describes in detail the standardized algorithm for collecting and evaluating the TA value of the eNodeB system, the steps are as follows:
  Step 1: Initialize i=0 loop value, count=0 along with a given number of N samples.
  Step 2: Store the TA value of N samples through the TA information section of the Ministry of Statistics and evaluate the transmission rate with the change of the location of data users,
  Step 3: Implement standardization of data by algorithm unit for TA.
  Step 4: Repeat the index from i to N,
    In case i<N is true, continue checking the condition
      If the value (TA<28) or (TA>33) is correct:
        Then increase the count variable to 1 unit then increase the variable i to 1 unit
      If the value (TA<28) or (TA>33) is wrong:
        Then increase the count variable i to 1 unit.
        The loop cycle in case of still meeting the condition code i<N.
    Where i<N is false:
      End the iteration process, switch to the ratio conversion according to the sample method, in which the number of samples counted TA satisfies the above condition is the value of count and N survey samples. The formula converted as follows:

$$\text{Ratio\_TA\_moving} = \frac{(\text{Count} * 100)}{N}$$

where Ratio_TA_moving represents the ratio of TA whose values are outside the range of 28 to 33.
Step 5: Save the Ratio_TA_moving calculation above and proceed to check
  Case Ratio_TA_moving>10% is true:
    Then update the status of TA check flag by 1.
  Case Ratio_TA_moving>10% is wrong:
    Then update the status of TA check flag by 0.
  Store this state on the clipboard to serve the environment decomposition shown in FIG. 10. Then finish the program.
FIG. 8 describes in detail the algorithm for standardizing and evaluating the SINR value of the eNodeB system, the steps are as follows:
  Step 1: Initialize the loop value i=0, count variables count=0 along with the number of samples is a given N.
  Step 2: Storing the SINR value of N samples through the Ministry of Statistics SINR information store information value assessing the transmission rate failure due to poor signal quality, unit SINR value collection dB (SINR_dB)
  Step 3: Standardize data in algorithm units for SINR by the following formula:

$$\text{SINR} = (\text{SINR\_dB} + 128) * 2$$

Figure 10:
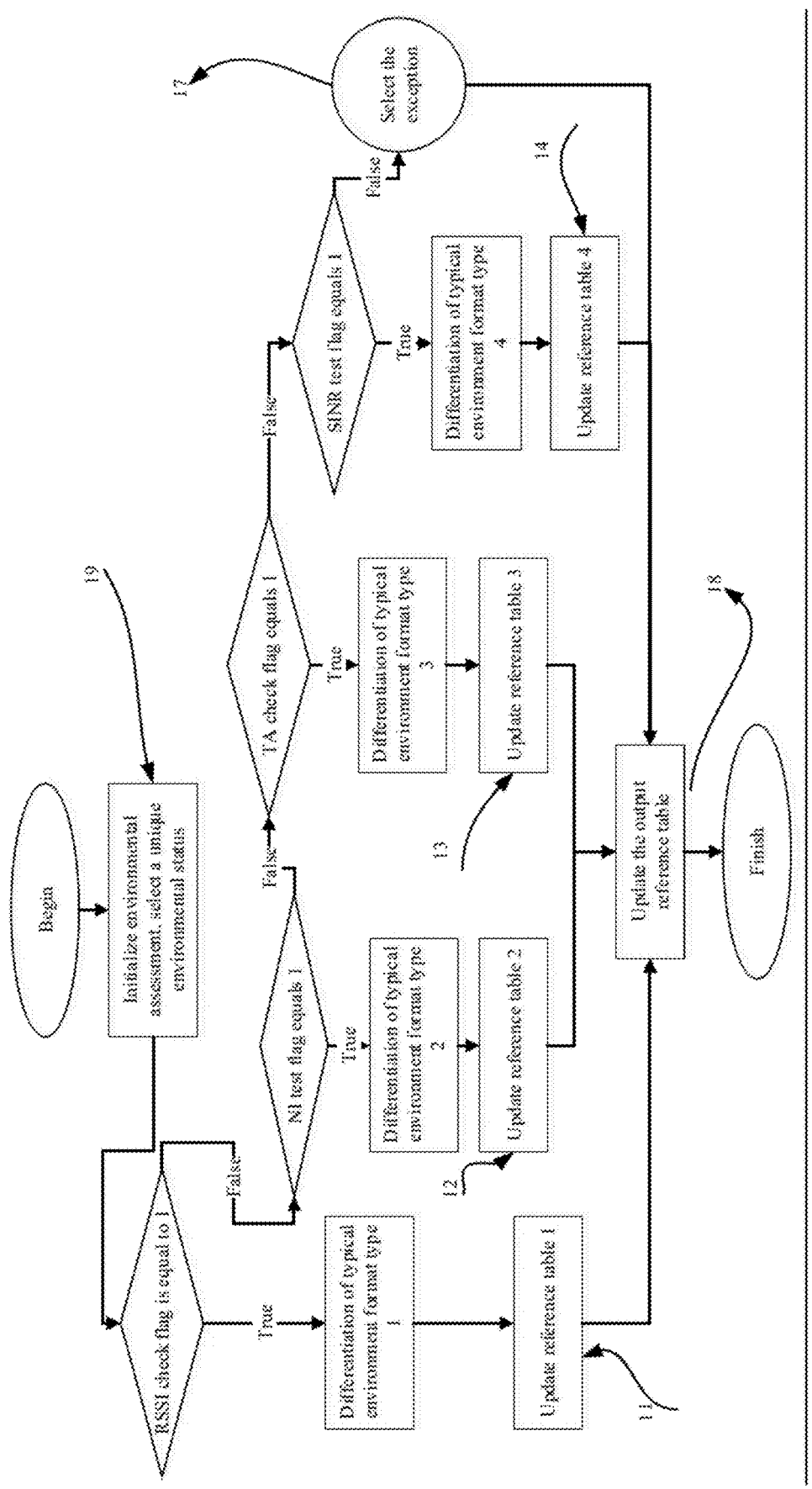
FIG. 10 is a block diagram drawing of a typical environmental decision algorithm and reference table for each environment.

Step 4: Perform index iteration from i to N,
    If i<N is correct, continue checking the condition
      If the SINR<118 value and the packet decoding result is wrong:
        Then increase the count variable to 1 unit then increase the variable i to 1 unit.
      If the SINR<118 value and the packet decoding result is wrong:
        Then increase the count variable i to 1 unit.
        The loop cycle in case of still meeting the condition code i<N.
    Where i<N is wrong
      Then at the end of the iteration process, convert to proportional conversion by the method of sample percentage, in which the number of samples counted by SINR that satisfies the above condition is the values of count and N samples. The formula converted as follows:

$$\text{Ratio\_SINR\_low\_fail} = \frac{(\text{Count} * 100)}{N}$$

where Ratio_SINR_low_fail represents the SINR ratio with a value lower than 118 and decodes the information is wrong.
  Step 5: Store the calculation value Ratio_SINR_low_fail above and proceed with the test
    Case Ratio_SINR_low_fail>15% is true:
      Then update the state of the SINR check flag by 1.
    Case Ratio_SINR_low_fail>15% is wrong:
      Then update the status of the check flag with SINR 0.
    Store this state on the clipboard to serve the environment decomposition shown in FIG. 10. Then finish the program.
FIG. 10 shows a detailed description of the flow of environmental differentiation after synthesis as described in FIG. 3 and details in FIG. 5,6,7,8. The steps are as follows:
  Step 1: Initialize the evaluation of the environment, select a unique environmental status.

Figure 11:
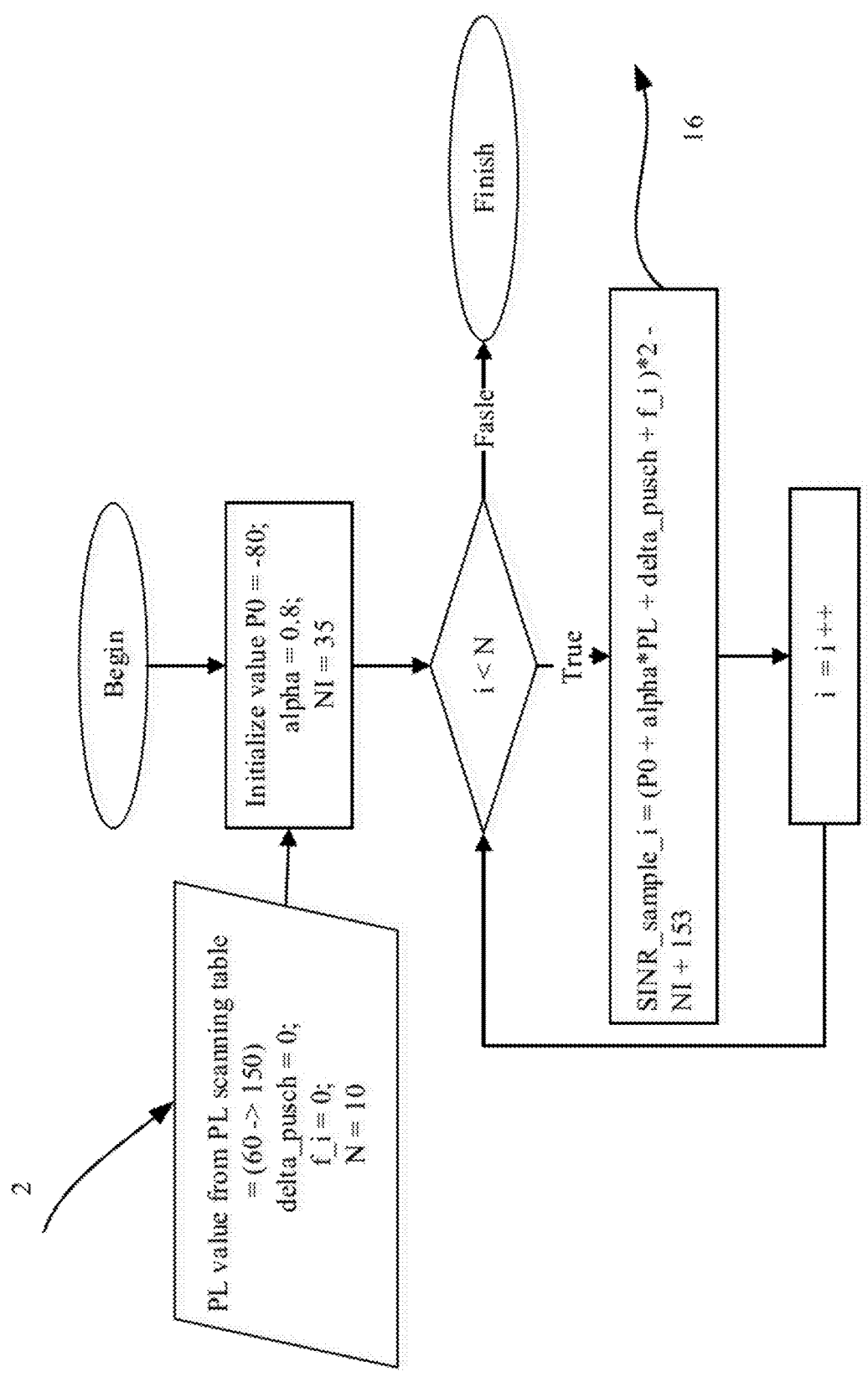
FIG. 11 is a diagram of a block diagram describing the algorithm for calculating the value of each SINR sample before putting it into reference.
Figure 12:
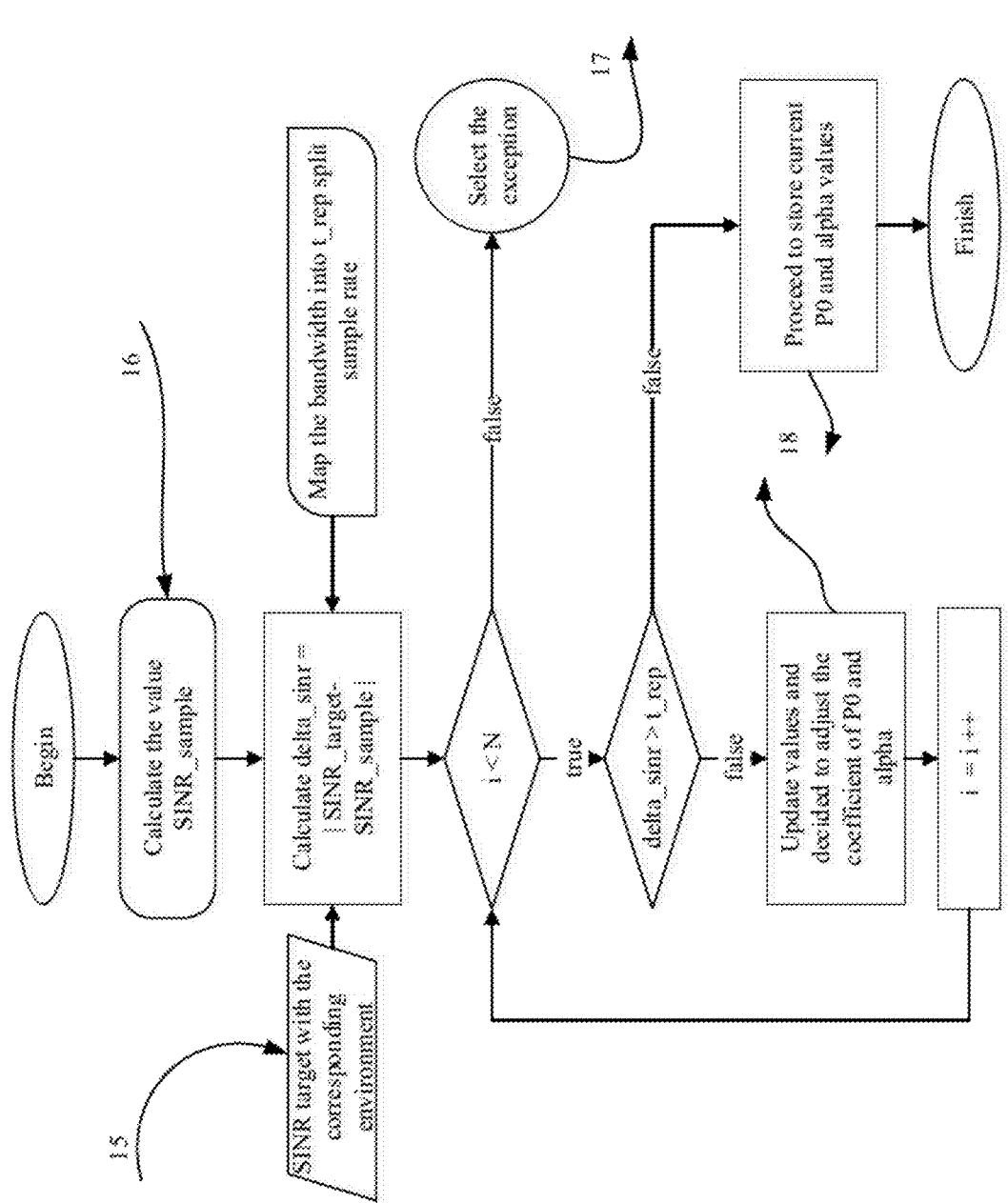
FIG. 12 is a block diagram depicting the algorithm and decides to update the P0 and alpha values for the environment-adjusted system.
Figure 13:
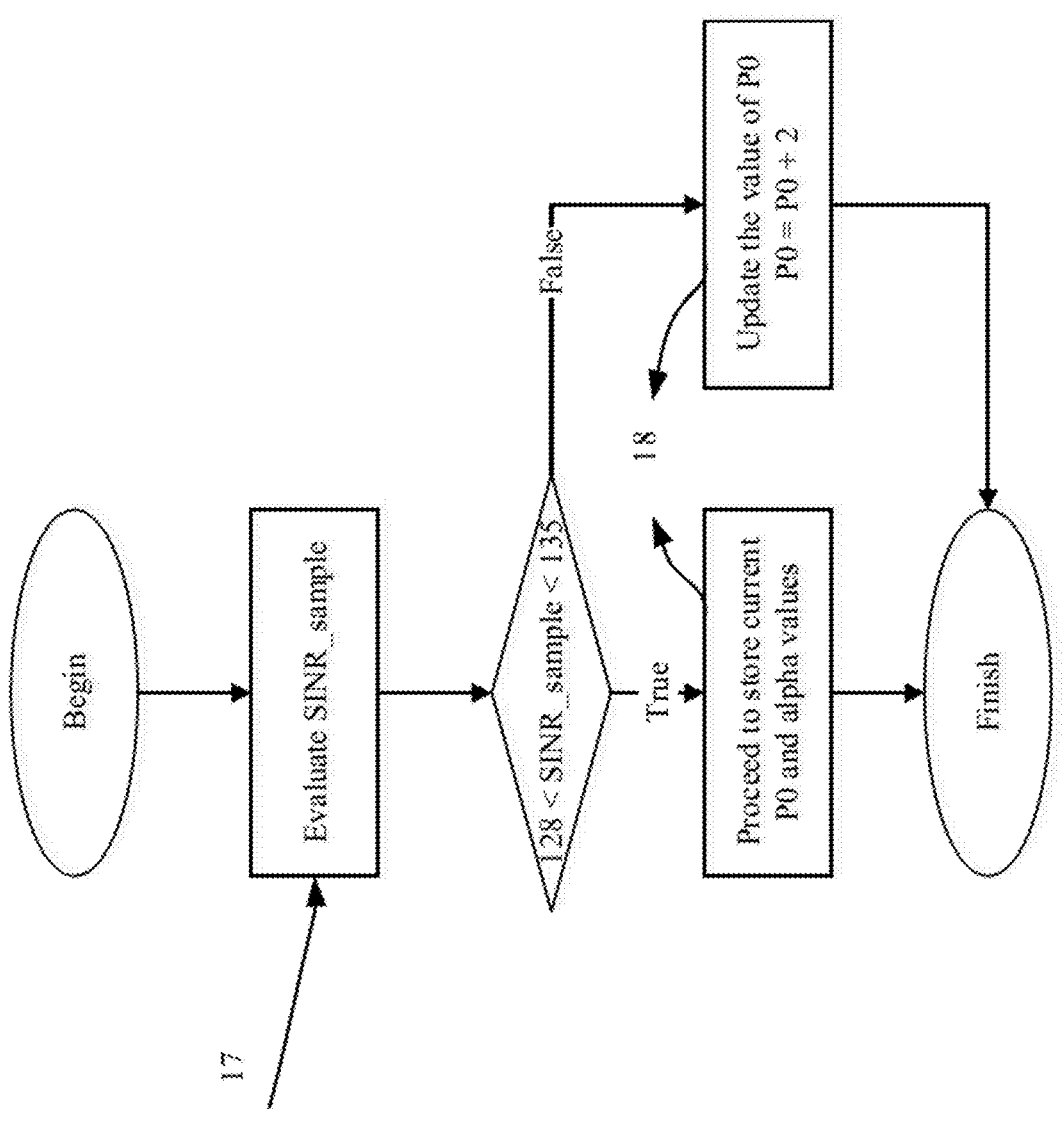
FIG. 13 is a block diagram drawing of an algorithm that updates the P0 and alpha values for exceptions.

Step 2: Check scanning conditions:
  Where the RSSI check flag is equal to 1:
    Then update the level of environmental format characteristic type 1.
      Update the reference table 1 for the SINR value referenced by the following array:
        [120 122 124 126 128 129 131 133 135 137 138 141 142 144 146 148 149 151 155 156 161 155 156 159 161 162 165 165 173];
      where each value corresponds to the level of MCS (Modulation and Coding Scheme) modulation from 0 to 28.
    If the test flag NI is 1 is true:
      Then update the level 2 characteristic format differentiation.
      Update the reference table 2 for the SINR value referenced by the following array:
        [121 123 126 127 130 131 132 133 134 137 138 141 142 144 146 147 151 153 157 161 162 160 162 164 165 166 168 169 174];
      where each value corresponds to the MCS modulation level from 0 to 28 respectively.
  Where the TA check flag is 1 is true:
    Update the level of characteristic type 3 classification.
    Update the reference table 3 for the SINR value referenced by the following array:
      [120 121 122 123 127 128 130 131 131 135 137 138 142 144 144 145 148 148 150 151 155 158 160 162 165 165 168 168 172];
    where each value corresponds to the MCS modulation level from 0 to 28 respectively.
  If the check flag SINR equals 1 is true:
    Update the level of typical environment format differentiation type 4.
    Update the reference table 4 for the SINR value referenced by the following array:
      [126 128 130 132 134 135 136 138 140 141 144 145 146 148 151 153 156 158 163 165 168 163 165 168 171 174 177 181 189];
    where each value corresponds to the MCS modulation level from 0 to 28 respectively.
Step 3: Select the exception described in detail in FIG. 13 as follows:
  Perform a SINR_sample was taken from FIG. 12 and FIG. 11.
    Case condition 128<SINR_sample<135 is true:
      Then Proceed to store the current P0 and alpha values then end the program.
    Case condition 128<SINR_sample<135 is wrong
      Execute update P0 value according to the formula:
        P0=P0+2
      Then finish the program.
Step 4: Update the output reference table for the system.
FIG. 12 shows a detailed description of the quantitative algorithm and mapping from the differentiated environment as a detailed result in FIGS. 3 and 4, and shows the appropriate treatment and correction, real steps, show as follows:
  Step 1: Calculate the SINR_sample for the detailed results from FIG. 11. The calculation method is described in detail as follows
    Initializing the scan value PL ranges from 60 to 150, the value delta_pusch=0, f_i=0, N=10, the counter i=0, Initialize value P0=−80; alpha value=0.8; NI value=35.
    Perform the loop under condition i<N, if it is done, calculate the formula according to the formula SINR_sample_$i$=(P0+alpha*PL+delta_pusch+$f\_i$)*2−NI+153

Inside:
        SINR_sample_i is the average true SINR value of the sample i,
        delta_pusch is the data channel coefficient that users route up, the value assigned to 0,
        f_i is the sample i of the offset update index, the value assigned to 0,
        NI is the standard interference and noise index,
        P0 and alpha have been described above.
      Increase the counting variable to 1 unit
      If the condition i<N is false, the program ends.
      Simultaneously obtain the SINR target with the corresponding environment described in detail in FIG. 10.
  Step 2: perform the calculation of delta_sinr value according to the formula delta_sinr=|SINR_target−SINR_sample|

Bandwidth mapping into t_rep repeater division described in detail in FIG. 3 with a reference table of the reference value of the signal according to each type of data modulation,
    Comparing with the calculated value compared with the ratio of looping repeating pattern to bandwidth with the formula:

$$t\_rep = \left\lfloor \frac{10*(\log_{10}nRB)}{t\_sam} \right\rfloor$$

Inside:
      t_rep is the filter index that determines the difference to the maximum standard for each bandwidth,
      t_sam is the corresponding scaling factor for each bandwidth,
      nRB is the maximum number of physical resources corresponding to each bandwidth.
      details the value of t_sam and nRB according to the bandwidth shown in the table below:

| Bandwidth 20 MHz | Bandwidth 15 MHz | Bandwidth 10 MHz | Bandwidth 5 MHz | Bandwidth 3 MHz | Bandwidth 1.4 MHz |
|---|---|---|---|---|---|
| t_sam = 6 nRB = 100 | t_sam = 6 nRB = 75 | t_sam = 5 nRB = 50 | t_sam = 4 nRB = 25 | t_sam = 3 nRB = 15 | t_sam = 2 nRB = 6 |

Step 3: Perform condition tests
    In case of condition i<N is true:
      Then perform the condition check Delta_sinr>t_rep case is true:
        Then update the value and decide to adjust the coefficient P0 and alpha
        Increase the counter value to 1 unit
        Repeat the set of parameters P0 and alpha until the status of delta_sinr is smaller than the value of t_rep,
      Delta delta_sinr>t_rep case is wrong
        Proceed to storing the current P0 and alpha values and ending the program
    If case i<N is wrong
      Carry out the selection of exceptions with the algorithm described in detail in FIG. 13.

Example of the Invention

In fact, the system established by the method of invention has been applied in laboratories and deployed in reality.

Figure 14:
FIG. 14 is a drawing depicting how to set up the system and apply the invention in the eNodeB lab of VIETTEL.

FIG. 14 shows the actual installation of the system in the electronic laboratory of the eNodeB project, the sequence of establishing and applying the invention method is described as follows. Actual system setup includes CTC/BBC setup in which real-time software collection and calculation software is implemented by author using C/Python language in Linux environment; then apply the set of system parameter sets as shown in Table 1; CTC/BBC connected to antenna system RRU 2 to receive 2 transmissions via CPRI interface; Setting up iPhone phones is a user device; UE data exchanged with RRU is converted to digital data to CTC/BBC, then the software collecting—calculating real time will collect input data and normalize data by the algorithm described in detail. In the above figures, the output is capable of differentiating each type of environment and adjusting its compatibility with each environment. Finally, perform the controls to adjust the magnetic power control value in accordance with the test environment of P0_PUSCH=−101 and alpha=1.0; continue to order from CTC to BBC. The results after optimization are reflected by the network quality parameters as shown in Table 2 and the Key Performance Indicator (KPI) as shown in Table 3.

TABLE 1

System parameter set

| Parameters | Configured Parameters |
|---|---|
| Common parameters | bandwidth: 10 MHz<br>ratio t_sam: 5<br>number of Resouce Block (nRB): 50<br>number of system antenna: 2.<br>Serving Cell Identity (Cell_ID): 0<br>Flag of Hopping (Hopping_mode): 0<br>Circular Shift in DMRS (csDMRS): 0<br>Delta Shift for PUSCH (deltaShift): 0<br>repetitive prefix mode: normal |
| Control parameters of opening loop | Initial Power of PUSCH channel (P0_PUSCH): −80 dB<br>Power control factor (Alpha): 0.8 |
| Control parameters of close loop | Accumulation = 1<br>target_SINR and path_loss respectively on PUSCH<br><path_loss> 0 → 90 <target_SINR>168<br><path_loss> 91 → 100 <target_SINR>160<br><path_loss> 101 → 110 <target_SINR>150<br><path_loss> 111 → 120 <target_SINR>140<br><path_loss> 121 → 130 <target_SINR>130<br><path_loss> 130 → 255 <target_SINR>128<br>Coefficients increase capacity at the levels respectively:<br>TPC_0, TPC_1, TPC_2, TPC_3.<br>TPC_0: −255->−12<br>TPC_1: −11->−5<br>TPC_2: −4->0<br>TPC_3: 1->255 |

TABLE 2

Some parameters evaluate the network quality

| Statistical indicators for network quality | status before applying the patent | status after applying the patent | comments |
|---|---|---|---|
| The proportional distribution of the large noise area (NI >= 55) is equivalent to >= −108.5 dBm | 15.36% | 7.02% | After applying the invention method, the noise ratio at high noise areas decreases by 8.28%. |
| The proportional distribution of uplink decoding due to poor signal quality | 11.56% | 4.84% | After applying the invention method, the wrong decoding ratio due to poor signal quality decreased by 6.72%. |
| Proportional distribution of regions with average receiver signal strength (RSSI <= 45) equivalent <= −113.5 dBm | 32.00% | 45.24% | After the application of the Patent Method, the UE transmit power has decreased by 7.24% |
| The proportional distribution of successful random access | 85.37% | 91.87% | The random-access rate of success increased by 6.5% after the invention method was applied |
| Proportional distribution of upstream error (UL BLER) | 21.83% | 16.5% | The rate of faulty blocks is reduced by 5.33% after applying the invention method |
| Power reserve | 11 dB | 17 dB | The UE power reserve has increased by about 6 dB, which helps UE save transmit power and reduce noise in the system |

TABLE 3

KPI quality parameters of the system

| | KPI before the invention method is applied | | | KPI after the invention method is applied | | |
|---|---|---|---|---|---|---|
| Time | RASR (%) | RRC SR (%) | CSSR (%) | RASR (%) | RRC SR (%) | CSSR (%) |
| Feb. 6, 2018 | 61.12 | 98.41 | 98.19 | 72.83 | 99.54 | 99.14 |
| Jan. 6, 2018 | 64.36 | 99.03 | 98.80 | 70.10 | 99.52 | 99.27 |

Where:
RASR: Random Access Success Rate - The success rate of random-access procedure
RRC SR: Radio Resource Control Success Rate - The success rate of allocating radio control resources.
CSSR: Call Setup Success Rate - The rate of setting up a successful call or service.

Thus, KPI (100% is the highest standard value) after applying the invention method are 15 to 40% better than before applying the invention method.

The Benefits Achieved by the Invention

The system was established according to the invention method which is able to calibrate and control the receiver power. At the same time, the invention method brings the best effect when compatible with each type of transmission medium, overcoming the disadvantage of slow variation with the old control type. Improve network quality in particular and network KPIs in general.

What is claimed is:
1. A method for adjusting and controlling a receiver power adaptation according to a transmission environment in an eNodeB LTE system comprising:
  a) Set up an initialization parameters and an input data collection system including the following steps:

ai) initialize a system setup with a number of input antennas and a number of corresponding bandwidths, aii) set initialization parameters for a non-closed (Open-Loop) P0 and an alpha power control values; where P0 is an absolute initial capacity for an uplink user data channel (Physical Uplink Shared Channel—PUSCH), alpha is a relative value of a power of a user device (User Equipment—UE) with a current location when accessing, aiii) Measure and obtain statistics of an input parameter set including: a Signal per Interference and Noise Ratio (SINR), a Received Signal Strength Indication (RSSI), a relative position of the user device (Timing Advance—TA) and noise (Noise plus Interference—NI) according to an N pattern cycle through a collection software—real-time calculation, b) Standardization, data assessment and classification of typical environments includes the following steps:

bi) calculate an average real SINR value of N samples collected in step aiii) by the following formula:

$$SINR\_sample\_i = (P0 + alpha*PL + delta\_pusch + f\_i)*2 - NI + 153$$

In which:

SINR_sample_i is the average real SINR value of the sample i;

delta_pusch is a data channel coefficient of the uplink user, the value assigned is 0;

f_i is a sample i of an offset update index, the value assigned to 0;

NI is an interference index and a standard noise;

P0 and alpha are described above;

bii) standardize the collected samples according to the input parameter set;

biii) compare a post-standardized value at the bii step) with a setting value of the environment to separate each type of typical environment by using a percentage assessment method against the input N sample, wherein:

if a percentage of the RSSI value is less than 40% of samples, then a RSSI state check flag is equal to 1, at which time a typical environment type 1 is differentiated;

if a percentage of NI value is bigger than 10% of samples, an NI state check flag is equal to 1, at which time a typical environment type 2 is differentiated;

if a percentage of TA value is bigger than 10% of samples, a TA status flag is equal to 1, at which time a typical environment type 3 is differentiated;

if a percentage of SINR value is bigger than 15% of samples and decoding wrong data (Ratio_SINR_low_fail>15%), a SINR flag is equal to 1, at which time a typical environment type 4 is differentiated;

c) calculate, adjust and apply an environmental adaptive control over time including the following steps:

ci) perform the environmental mapping defined in step biii) with a reference table of reference quality value of the signal according to each type of data modulation, cii) calculate the delta_sinr difference between the SINRs obtained in step ci) and the step bi), ciii) compare the calculated value in step cii) with a sampling rate repeated by bandwidth according to the following formula:

$$t\_rep = \left\lfloor \frac{10*(\log_{10}nRB)}{t\_sam} \right\rfloor$$

In which:

t_rep is a filtering index that determines a difference with a maximum standard for each bandwidth;

t_sam is a compatibility ratio corresponding to each bandwidth; and nRB is a maximum number of physical resources corresponding to each bandwidth;

civ) the final decision will follow the following principle:

if the delta_sinr value calculated in step cii) is greater than the value t_rep calculated in step ciii) then perform a value update and decide to adjust the coefficient P0 and alpha by repeating the set of parameters P0 and alpha until when a state of the delta_sinr value is less than the value of t_rep;

in case this state is not reached, an exception option that satisfies the condition of the SINR value calculated in the step bi) is between 128 and 135, and the current value of P0 and alpha is stored, if outside this range, increase P0 value by 2 units;

if the delta_sinr value calculated in step cii) is less than the value t_rep calculated in step ciii), update the current value of P0 and alpha.

* * * * *